No Printed Specification Available
6392X
S. Davis, Jr.,
Earth Scraper,
Patented Feb. 22, 1831.
Fig 1
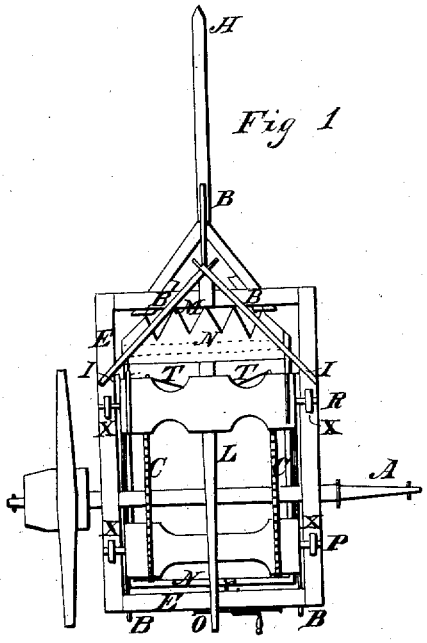
Fig. 2.
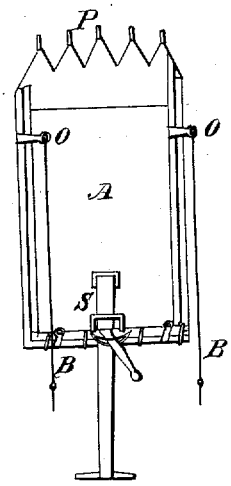
Fig. 3.
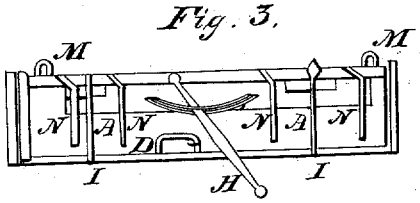
Fig. 4.
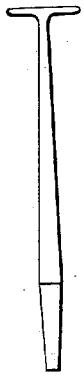
Fig. 5.
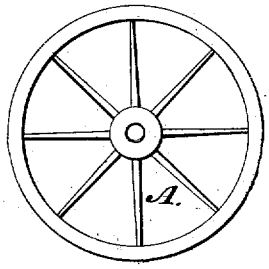
Fig. 6.
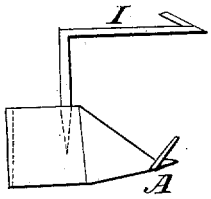
Fig. 7.
Inventor:
Shadrach Davis
N. PETERS, PHOTO-LITHOGRAPHER, WASHINGTON, D. C.

63924X Feb 22, 1831 157

Shadrach Davis Junr of Dartmouth Mass

Letters Patent

The schedule referred to in these Letters Patent and making part of the same
containing a description in the words of the said Shadrach Davis Junr
himself of his improvement in the machine for removing Stones &c.

To all to whom these presents shall come, Be it known that I
Shadrach Davis Junr of Dartmouth in the County of Bristol and
State of Massachusetts have invented a new and useful improvement in
a machine for removing earth, Stones &c and that the following is a
full and exact description of the construction and operation of the said machine as in-
vented or improved by me. said machine may be operated by Ox, horses
or steam power. Drawing Fig 1st A is an axletree. R P are wheels
or rollers. XXXX, are caps over the [illegible] of said wheels and secured
with bolts thro' the frame. F.F. is the frame said Rollers lay in. M
is a post with a crotch on the top. B.B. are braces securing the post and
frame. H. is the shaft or tongue to the carriage. B.B. are shafts fas-
tened one end in the frame and the other end to the straps on the scraper
as may be seen at O.C. in Fig 2nd with a joint in them near the
frame. N is the scraper. I I are chains one end fastened to the roller
and the other ends secured to the scraper at O.O. C C are chains fas-
tened to the back board of the said scraper, and pass over roller
P and fasten to Roller R. on the under side. T T are chains fasten-
ed to R and the scraper crosswise. L is a lever in R. O is a wheel
with a rope secured to it, and to the lever with a crank and notch wheel
and pole. Fig 2d A is the body of the scraper or drag. P are points
or shears with a cutter in them. O.O are straps. B B are braces of
shafts. S is a socket. Fig 3d A is a board in the back part of
the scraper to prevent the load from discharging. B is a bolt
bevelled in part on the upper edge. NNNN, are straps fasten-
ed to the board and secure the bolt to the side of the board. M M
are staples fastened to the board to receive the chains C.C. in Fig 1st.
O is a sweep fastened to the bolt. H is a lever one end [illegible]

Drawing

6392X to the edge of the board and pass thro' the sweep. II are springs fasten ed to the bottom of the scraper, and pass between the board and the bolt and secure the bolt across the bevel. D is a socket to receive the handspike to assist in loading. Fig 4th is a handspike. Fig 5th is a wheel. Fig 6th is a spring fastened to the after part of the scraper fastening the back board of the scraper and the scraper across the bevel of the bolt together. Fig 7th is a point or shear with a cutter in it.

The above machine is calculated to move earth, stone &c. and may be used in the following form. the power applied to the tongue, the lever thrown forward into the crotch will set the scraper to the ground then by raising the after part of the after part of the scraper will direct the points of said scraper into the ground. the carriage moving ahead will carry them under the earth or intended load the lever brought back will raise the load. now by ungearing the bolt in the back board from the springs that are attached to the bottom of the scraper will fall the back part of said scraper and discharge the load. for moving heavy stones may be hoisted and discharged in the same manner.

The above named points or shears I contemplate using on scrapers not hung on wheels for moving short distances.

The improvement I claim is not the whole machine described. I claim the points or shears with cutters in the fore part of them & the application of said scraper to wheels, and form of hanging it togeth er with applying said points to scrapers drawn without wheels.

Sgd. Witnesses }
Marshal C. Simmons } Shadrach Davis Junr.
Jno. Cummings }

(797 words)

(Granted Feb. 22. 1831.)